United States Patent [19]

Hereth et al.

[11] 4,315,957
[45] Feb. 16, 1982

[54] PROCESS FOR PROTECTING METAL OR LACQUERED SURFACES

[75] Inventors: Alfred Hereth; Klaus Rieger; Josef Wildgruber, all of Gersthofen, Fed. Rep. of Germany

[73] Assignee: Hoechst Aktiengesellschaft, Fed. Rep. of Germany

[21] Appl. No.: 162,758

[22] Filed: Jun. 25, 1980

[30] Foreign Application Priority Data

Jun. 29, 1979 [DE] Fed. Rep. of Germany ....... 2926197

[51] Int. Cl.³ .............................................. B05D 00/00
[52] U.S. Cl. ................................. 427/155; 106/14.11; 106/271; 427/156; 428/467
[58] Field of Search ................ 106/271; 427/154, 155, 427/156; 428/467

[56] References Cited

U.S. PATENT DOCUMENTS

| | | |
|---|---|---|
| 2,536,018 | 1/1951 | Schoenholz et al. ............. 106/271 |
| 3,551,169 | 12/1970 | Congdon ............................ 106/271 |
| 4,040,996 | 8/1977 | Van Vonno ........................ 106/271 |
| 4,058,409 | 11/1977 | Kesslin ............................... 106/271 |
| 4,083,731 | 4/1978 | Brotz et al. ........................ 106/271 |

Primary Examiner—Lorenzo B. Hayes
Attorney, Agent, or Firm—Connolly and Hutz

[57] ABSTRACT

The invention relates to a process for the temporary protection of metal and lacquered surfaces comprising applying thereto an aqueous emulsion containing a hydrocarbon wax or the oxidate thereof, optionally waxes based on montan wax and/or natural waxes, as well as a basic saponifying agent and emulsifiers. The wax films resulting from the emulsions are waterproof, however, they are easily removable—even after aging—without the use of a solvent being necessary, merely by a treatment with a water-steam mixture.

1 Claim, No Drawings

PROCESS FOR PROTECTING METAL OR LACQUERED SURFACES

Temporary corrosion inhibitors are employed in the automotive industry and machine construction for the protection of lacquered and bright metal surfaces. In contra-distinction to anti-rust lacquers and chemical passivation processes the protective film is meant to protect only temporarily and thereafter to be removed easily and completely. Generally and preferably there are used solvent-containing wax dispersions, as they have been described, for example, in German Pat. No. 1,669,155, and the wax coatings have to be removed with the aid of solvents or surfactant-containing water-solvent mixtures prior to putting the protected objects into service. When being applied and removed, the evaporating solvents are not only annoying for the workers, but generally represent an environmental problem which is to be avoided.

Hence, there have been numerous attempts to apply the wax coatings in the form of aqueous emulsions.

The object to be achieved has been to control the properties of the film being formed on the lacquered surface by choosing suitable raw materials, such as film-forming agents, emulsifiers and further additives to the effect that after applying the aqueous emulsion by spraying, dipping, brushing, etc. there is formed a protective layer which dries within a sufficiently short time as compared with solvent-containing formulations and which is subsequently supposed to be resistant to the influences of rain and removable as easily as possible, if required.

Aqueous wax emulsions for the purpose of temporary surface protection and corrosion inhibition, which consist of hydrocarbon waxes (cake paraffin and synthetic paraffin), paraffin base hydrocarbon oils, ammonium salts of high-melting industrial montanic acids as emulsifiers and paraffin oxidates, yet which still contain a solvent, namely 10% of white spirit, have been described for example in German Auslegeschrift No. 1,227,592 and GDR Pat. No. 31,887. The protective coating is removed with white spirit or warm water, with the addition of industrial cleansing agents.

From German Offenlegungsschrift No. 1,519,007 there have been known preservatives for lacquered surfaces which consist of waxes dispersed in gasoline (boiling range ca. 100°–140° C.) and/or paraffins with a molecular weight of from 400 to 1100 which have branched hydrocarbon chains and/or cyclic portions. Said waxes are reported to be also suitable for preparing aqueous preservative emulsions, however, the above-mentioned Offenlegungsschrift (laying-open document) does not comprise any application examples to this effect, nor any further details.

According to the specifications given in the above Offenlegungsschrift the preservatives based on the aforementioned waxes are marked by the fact that the components contained in the wax films do by no means diffuse into the lacquer coating, not even in the case of incompletely hardened lacquers and subsequent heating due to insolation, i.e. no exudation is to be observed after washing off the protective wax layer. The preservative is removed with the aid of solvents which do not attack the lacquer, for example gasoline or petroleum with or without the addition of emulsifiers.

Finally, in German Offenlegungsschrift No. 1,519,220 there have been described aqueous solutions or emulsions which are composed of polyacryl compounds (preferably polyacrylamide), polyvinyl acetate and other polyvinyl compounds, carnauba wax or montan wax, and triethanolamine as ionic wetting agent, or polyoxyethylene alkylaryl ether as non-ionic wetting agent. Prior to treating the surfaces to be protected, it is necessary in this case to carefully clean the same at first, for example with a foam-like detergent. The water-repellent coatings may be removed with a slightly alkaline cleansing solution.

Thus, the preservatives known so far do not fully meet the requirements of the automotive industry with respect to anti-pollution preservation systems.

Hence, it has been an object of the present invention to develop emulsions to be used for the temporary protection of lacquered and bright metal parts (for example for intermediate storage) which are composed without any solvent—only on the basis of water—and which may be removed with a water-steam mixture (without additives).

It has now been found that alkaline wax emulsions of a determined composition meet the above requirements in excellent manner.

Thus, the subject of the invention is an aqueous liquid preservative mainly consisting of waxes finely divided in water by means of an emulsifier, which preservative consists essentially of from 0 to 30% by weight of an acid wax based on montan wax with a drop point of 78° to 100° C. and an acid number of from 100 to 200, or of an ester wax based on montan wax with a drop point of 70° to 91° C., an acid number of from 1 to 100 and a saponification number of from 80 to 180, or of a mixture of those waxes, of from 0 to 20% by weight of a natural wax, of from 5 to 50% by weight of a hydrocarbon wax or an oxidate of such wax, or of a mixture of those waxes, of from 0.01 to 3.0% by weight of a basic saponifying agent, of from 0.5 to 8% by weight of an emulsifier and the amount of water making up 100% by weight.

By waxes based on montan wax there are to be understood acid waxes with a drop point of from 78° to 100° C., preferably 80° to 90° C., and an acid number of from 100 to 200, preferably 100 to 150, and ester waxes having a drop point of from 70° to 91° C., preferably 78° to 88° C., an acid number of from 1 to 100, preferably 20 to 50, and a saponification number of from 80 to 180, preferably 100 to 150. Waxes of this kind are sold by various suppliers. The amount in the emulsion is in the range of from 0 to 30, preferably 4 to 20, and especially 6 to 15% by weight.

As examples for natural waxes which may be contained in the emulsions in an amount of from 0 to 20, preferably 0 to 15, and especially 0 to 12%, by weight, there may be mentioned for example carnauba wax, candelilla wax and Japan wax.

Hydrocarbon waxes appropriate for the preservative of the invention are paraffins with a softening point (SP) of from 48 to 62, preferably from 50° to 56° C., synthetic paraffins with a softening point of from 98 to 104, preferably 102° to 104° C., high-molecular wax-like (about $C_{30}$) 1-olefins with an SP of from 70 to 75, preferably 73° to 75° C., microcrystalline waxes having an SP of from 50 to 90, preferably 60° to 70° C., for example petrolatum cuts of this softening range, and polyolefin waxes having an SP of from 100 to 130, preferably 110° to 130° C. The hydrocarbon waxes also include the oxidates thereof, especially the polyolefin wax oxidates with a drop point of from 95 to 130, preferably 100° to 115° C., and an acid number of from 1 to 70, preferably 15 to 30. The hydrocarbon waxes are contained in the emulsions in an amount of from 5 to 50, preferably 10 to 25 and especially 10 to 20%, by weight. Preferred hydrocarbon waxes are the microcrystalline waxes.

In the case of the above-mentioned waxes based on montan wax and in the case of the hydrocarbon waxes and their oxidates, as well as in the case of the natural waxes, mixtures of several representatives of the respective group may be employed.

The drop point, the acid number and the saponification number are determined according to the standard methods of the German Society for Fat Research (DGF):

| Drop point DGF-M-III 3 (75) | (DP) |
| Acid number DGF-M-IV 2 (57) | (AN) |
| Saponification number DGF-M-IV 2 (57) | (SN) |

The softening point (SP) is determined according to DGF-M-III 13 (75).

By the term "basic saponifying agents" there are to be understood alkali metal and alkaline earth metal hydroxides, especially alkali metal hydroxides, such as NaOH, KOH, LiOH, amines, for example triethanolamine, diethylaminoethanol, aminomethyl propanol as well as ammonia. Particularly suitable are lithium and potassium hydroxide. The alkali metal hydroxides are advantageously used as aqueous solutions of 5 to 50% by weight. The amount of basic saponifying agent is generally in the range of from 0.01 to 3.0, preferably 0.02 to 1, and especially 0.02 to 0.5%, by weight, calculated on 100% saponifying agent and emulsion amount.

The preservative of the invention further contains from 0.5 to 8, preferably 2 to 6 and especially 2 to 4%, by weight of an emulsifier. Said agent may be an anionic emulsifier (for example an alkane sulfonate or a petroleum sulfonate), a cationic emulsifier (for example fatty amines, sec. and tert, alkoxy amines, quaternary ammonium compounds), or a non-ionogenic emulsifier (for example alkyl phenols, oxethylated fatty alcohols with from about 5 to 25 mols of ethylene oxide). It is also possible to combine the emulsifiers with one another, preference being given to alkane sulfonates.

The water contained in the emulsions should be demineralized, if possible. The amount is measured such that there are always 100 parts by weight of ready-made emulsion, in which there are contained at least 50% by weight of water. Finally, corrosion inhibitors, for example alkanolamine salts of nitrogen-containing condensation products, or substances serving as processing auxiliaries, for example from 0.001 to 0.05% by weight (calculated on the basic emulsion) of a wetting or levelling agent, for example a fluorine surfactant, and/or from 0.5 to 3% by weight of an oxethylated fatty alcohol and/or an alkylphenol, may also be added to the preservative emulsion.

For preparing the preservative of the invention, the waxes are melted at a temperature of from about 100° to 130° C., then the saponifying agent is added, and the mixture is maintained at this temperature for about 5 to 15 minutes. Thereafter the emulsifier is added, and the batch is emulsified by mixing it with water, while stirring. The water is optionally added to the wax melt, or the latter is introduced by stirring into the water being present. In this manner, emulsions of up to 50% strength may be obtained as required. With emulsions of 25 to 30% strength, which are preferred, films having a thickness of the dry film of from about 10 to 15 microns may be obtained. The emulsions should be applied with spray guns operating according to the combination spraying process (material pressure=airless+additional air coating at the spray nozzle). If the spraying is effected according to the airless method or with compressed air only, irregular films might be obtained.

The preservative of the invention has the following advantages:

1. No autoclave is required for the emulsification which may be carried out in the open vessel.
2. The emulsions are very finely divided and stable to storage for several weeks.
3. They form on freshly lacquered surfaces as well as on bright metal parts uniformly closed films which show a thickness of the dry layer of 15 microns when 30% emulsions are applied.
4. After a drying period of 30 to 60 minutes at room temperature or 10 minutes in a current of warm air of about 40° C., the films are generally waterproof.
5. The wax films may be removed with a water-steam mixture of about 90° to 95° C. without additives. The same is true also for films having been exposed to a weather test—about 6 weeks in the open air—and for artificially aged films which have been washed for 2 hours (water pipe) and tempered for 2 hours at 75° C. 6. Upon complete removal of the wax films, the lacquers do not show any damage, such as a swelling, dulling, blooming, etc.

The following Examples, in which the amounts indicated are always parts by weight, serve to further illustrate the invention.

EXAMPLES 1 to 12

In a stirring vessel the waxes are melted at a temperature of 120° C. Subsequently the saponifying agent is added, and when no more foaming is observed, i.e. after about 10 minutes, the emulsifier is added, and the batch is emulsified with stirring in demineralized boiling water. The cooled emulsion is applied onto test plates with the aid of a combination spray gun and is then tempered for 6 hours at 70° C. in a drying cabinet. The test plates are coated with original lacquers, as they are used in the automotive industry. After baking, the coats of lacquer are at most 24 hours old.

Upon removal of the wax layer from the lacquered surfaces by means of a steam jet device, the lacquer is visually inspected for damages (diffusion and subsequent exudation, swelling, peeling of the lacquer up to the priming coat).

The following Table shows some typical formulations of preservatives of the invention. The amounts indicated are parts by weight. In cases where aqueous raw substances have been used (alkali, alkane sulfonate), the amounts thereof have been calculated on 100% material. The amount of water is always "ad 100". It is shown in the Table with "ca.".

| Components of the emulsion or test of the film | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Acid wax on a montan wax basis | 4.3 | — | — | — | — | 1.0 | — | — | — | — | — | — |

-continued

| Components of the emulsion or test of the film | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| AN 140; DP 84° C. Ester wax on a montan wax basis | — | — | 14.0 | — | 10.0 | 9.0 | 11.0 | 12.7 | 11.0 | — | 6.1 | 6.4 |
| AN 30; SN 128; DP 83° C. Carnauba wax | — | — | — | 9.5 | — | — | — | — | — | 10.3 | — | — |
| Polyethylene wax, oxidized AN 21; DP 108° C. | — | 10 | — | — | — | — | — | — | — | — | — | — |
| Japan wax | — | — | — | — | — | — | — | — | — | — | 7.2 | — |
| Micro wax SP 60–70° C. | 10.0 | 16.0 | 14.0 | 14.0 | 10.0 | 10.0 | 3.0 | 16.7 | 15.4 | 19.5 | 16.4 | 13.6 |
| Paraffin SP 50–56° C. | — | — | — | — | — | — | 4.6 | — | — | — | — | — |
| Synthetic paraffin SP 102–104° C. | — | — | — | — | — | — | 3.4 | — | — | — | — | — |
| Alkali[1] | 0.03 | 0.04 | 0.05 | 0.06 | 0.08 | 0.08 | 0.05 | 0.05 | 0.05 | 0.05 | 0.06 | 0.05 |
| Alkane sulfonate[2] | — | — | — | 1.5 | 2.4 | 1.8 | 1.8 | 1.2 | 1.2 | 1.3 | 1.4 | 1.0 |
| Fatty aminoxethylate[3] | 0.7 | — | — | — | 0.1 | — | — | — | — | — | — | — |
| Fatty alcohol oxethylate[4] | — | 4.8 | 5.1 | — | — | — | — | — | — | — | — | 0.4 |
| demin. water ca. ... | 85 | 69 | 39 | 75 | 77 | 78 | 65 | 69 | 61 | 69 | 69 | 79 |
| Heat resistance | resistant at −25 to +80° C. | | | | | | | | | | | |
| Removability | very good with a water-steam mixture | | | | | | | | | | | |
| Lacquer damage | none after 6 hours at 70° C. | | | | | | | | | | | |

[1] Exs. 2 and 3 KOH, for the rest LiOH. Use as 5.6 or 5.3% aqueous solution
[2] Sulfonate of $C_{13}$–$C_{18}$-n-paraffins. Use as 60% solution in water
[3] $C_{12}$– to $C_{18}$ fatty amines with 5-25 mols of E.O.
[4] $C_{16}$– to $C_{24}$ fatty alcohols with 5-25 mols of E.O.

What is claimed is:

1. A process for temporarily protecting a metal or lacquered surface with a wax coating which is easily removable by treatment with a water-steam mixture, said process comprising applying a liquid, aqueous wax-containing preservative onto said surface, said preservative consisting essentially of
   (a) from 4 to 20% by weight of an acid wax based on montan wax with a drop point of 80° to 90° C. and an acid number of from 100 to 150, or an ester wax based on montan wax with a drop point of 78° to 88° C., an acid number of from 20 to 50 and a saponification number of from 100 to 150 or of a mixture of said waxes,
   (b) from 0 to 12% by weight of a natural wax selected from the group consisting of carnauba wax, candelilla wax, ouricoury wax and Japan wax,
   (c) from 10 to 20% by weight of a hydrocarbon wax selected from the group consisting of cake paraffin with a softening point of from 50° to 56° C., synthetic paraffin with a softening point of from 102° to 104° C., high-molecular 1-olefin with a softening point of from 73° to 75° C., micro-crystalline wax with a softening point of from 60° to 70° C., polyolefin wax with a softening point of from 100° to 130° C. and polyolefin wax oxidate with a drop point of from 100° to 115° C. and an acid number of from 15 to 30, or a mixture of said waxes,
   (d) from 0.02 to 0.5% by weight of lithium or potassium hydroxide,
   (e) from 0.5 to 8% by weight of an alkane sulfonate as emulsifier, and
   (f) water in an amount so that the total of (a) through (f) is 100% by weight.

* * * * *